(12) United States Patent
Hoshizawa (10) Patent No.: US 7,747,906 B2
(45) Date of Patent: Jun. 29, 2010

(54) RECORDING AND REPRODUCING APPARATUS AND DIGITAL DATA RECORDING METHOD

(75) Inventor: Taku Hoshizawa, Kawasaki (JP)

(73) Assignees: Hitachi, Ltd., Tokyo (JP); Hitachi- LG Data Storage, Inc., Tokyo (JP)

(*) Notice: Subject to any disclaimer, the term of this patent is extended or adjusted under 35 U.S.C. 154(b) by 479 days.

(21) Appl. No.: 11/622,075

(22) Filed: Jan. 11, 2007

(65) Prior Publication Data

US 2007/0291610 A1 Dec. 20, 2007

(30) Foreign Application Priority Data

Jun. 16, 2006 (JP) .............................. 2006-166814

(51) Int. Cl.
G06F 11/00 (2006.01)

(52) U.S. Cl. ..................... 714/49; 714/57; 369/53.15; 369/53.17; 369/53.2

(58) Field of Classification Search ................... 714/49, 714/54; 369/53.15, 53.17, 53.2
See application file for complete search history.

(56) References Cited

U.S. PATENT DOCUMENTS

2005/0152251 A1* 7/2005 Harumatsu .................. 369/53.2

2007/0086281 A1* 4/2007 Terada et al. ............. 369/30.07
2008/0031115 A1* 2/2008 Hwang et al. ................ 369/100
2008/0205227 A1* 8/2008 Hwang et al. ............. 369/53.17

FOREIGN PATENT DOCUMENTS

JP 2005-004912 1/2005
JP 2005-190539 7/2005

OTHER PUBLICATIONS

"Standard ECMA-272: 120mm DVD Rewritable Disc (DVD-RAM)" ECMA 1999 (pp. 43-55).

* cited by examiner

Primary Examiner—Yolanda L Wilson
(74) Attorney, Agent, or Firm—Antonelli, Terry, Stout & Kraus, LLP.

(57) ABSTRACT

A recordable optical disc includes a user area and a management information area. User data is recorded in a physical block used as a single unit, and the space bit map is recorded in the management information area. Integrity verification processing is performed for each of recording status information so as to verify the integrity of the recording status information indicating a recording status of the physical block and the recording status of the physical block on the recordable optical disc. The necessity of the integrity verification processing is determined by reading out the status information indicating the necessity of the integrity verification processing. When the integrity verification processing is determined to be necessary, the integrity verification processing is carried out for unverified recording status information of the recording status information of the space bit map.

12 Claims, 12 Drawing Sheets

| Byte No. | Stored data |
|---|---|
| 0-1 | Identifier = "SM" |
| 2-3 | SM update counter |
| 4-7 | Physical address B corresponding to physical address 0 |
| 8-11 | Maximum logical address 16*(a+1)-1 |
| 12-15 | (Reserve) |
| 16-19 | Integrity status |
| 20-23 | Verified address |
| 24-63 | (Reserve) |

RECORDING AND REPRODUCING APPARATUS AND DIGITAL DATA RECORDING METHOD

The present invention claims priority from Japanese application JP 2006-166814 filed on Jun. 16, 2006, the content of which is hereby incorporated by reference into this application.

BACKGROUND OF THE INVENTION

The present invention relates to a digital data recording system and, more particularly to a recording and reproducing system for recording digital data on recordable optical discs.

It has been known that there is a technique for management information to check whether or not data is recorded in physical blocks on recordable optical discs (refer to, for example, Japanese Patent Laid-open Nos. 2005-190539 and No. 2005-4912)

As an example of apparatus for recording digital data in a recording medium or reproducing digital data from a recording medium, there has been known a recording and reproducing apparatus for DVD-RAM as defined in "Standard ECMA-272: 120 mm DVD Rewritable Disc (DVD-RAM)" ECMA, 1999 (pages 43 to 55).

When an optical disc is loaded into the recording and reproducing apparatus, or the power for the apparatus is turned on, the apparatus first reads out disc management information data recorded in a disc management area DMA or the like that is stored in lead-in and lead-out areas so as to check whether the optical disc has been physically formatted. If the optical disc has not been physically formatted, the apparatus stands by until a physical format command is received from a higher-level device.

If the optical disc has been physically formatted, the recording and reproducing apparatus performs recording preparation processing, such as calibration or logical integrity verification, and then waits for a command from a higher-level device. Upon receiving any command from a higher-level device, the apparatus performs predetermined processing in response to the command. For instance, when receiving a record command, the recording and reproducing apparatus converts a format of the user data into a predetermined data format, and then records the data in a predetermined position on an optical disc. When receiving a reproduction command, the apparatus reconverts data recorded in a predetermined position on an optical disc into user data, and then reproduces the data for output to a higher-level device.

When receiving a command to unload an optical disc, the recording and reproducing apparatus stops rotation of a disc, and then perform discharge processing to discharge the disc from the apparatus.

Generally, in an optical disc recording and reproducing apparatus having a defect management function, user data recording processing includes integrity verification processing in which recorded data is reproduced to verify its validity. When it is determined as a result of the integrity verification processing that the validity of the recorded data is not sufficiently obtained, replacement processing is performed to dispose the user data in a spare area instead of a user area, thereby improving reliability of an optical disc.

According to the specification of ECMA-272, the correlation information of the user area and spare area addresses showing the result of the replacement processing is managed in the disk management area DMA as a defect list.

Next generation type optical discs, BD-R, which have been introduced in recent years and provides a large capacity with blue rays, have the same properties of recordable optical discs as DVD-R, and also provides a defect management system performing the random recording and replacement process in the same manner as DVD-RAM. Because of the configuration, management for checking whether any data is recorded in user areas on discs is performed by a space bit map (also referred to as space management information hereinafter).

Japanese Patent Laid-open Publication No. 2005-190539 describes a disc management information recording system for recordable optical discs, which is effective in recording and updating optical disc management information including space bit map on optical discs. The Publication, however, does not give any description on a restoration method for obtaining, from the past disc management information, disc management information that corresponds to a current optical disc, or secures integrity with a current optical disc. Such method is required in cases where it is impossible to properly read out desired disc management information, specifically the latest space bit map, from an optical disc upon loading an optical disc or setting up an optical disc recording and reproducing apparatus, or where disc management information has not been recorded on an optical disc since a high-level device fails to be properly terminated.

Japanese Patent Laid-open Publication No. 2005-4912 describes a disc management information recording system for recordable optical discs that is also effective in recording and updating optical disc management information including space bit map on optical discs and recovers disc management information when its integrity can not be obtained in a setting while recording and updating the management information. Such system, however, have the problem that it takes a long time to update optical disc management information.

SUMMARY OF THE INVENTION

It is therefore an object of the present invention to provide a recording and reproducing apparatus and a recording method for promptly restoring management information of recordable optical discs to acquire its integrity.

In order to achieve the above object, there is provided the following recording and reproducing apparatus and recording method according to the present invention.

DESCRIPTION OF THE PREFERRED EMBODIMENTS

An embodiment of the present invention is described below with reference to the attached drawings.

Optical discs according to the present embodiment have the same properties of recordable optical discs as a BD-R and yet are capable of achieving random writing and defect management by replacement processing in the same manner like in a DVD-RAM.

A configuration of an optical disc recording and reproducing apparatus and operations for recording and reproduction is described with reference to FIGS. 4 and 5.

Figure 4:
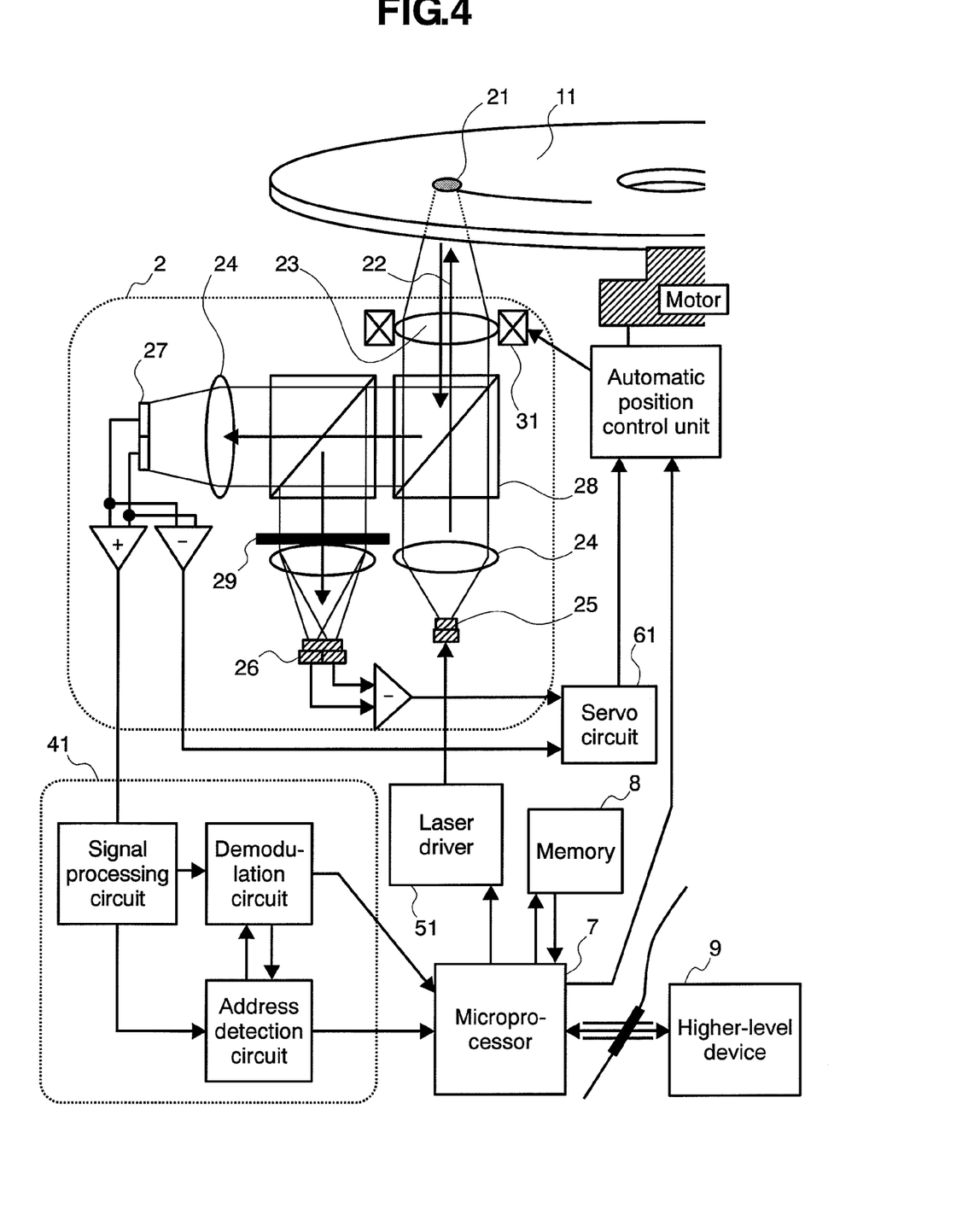
FIG. 4 schematically illustrates a configuration of an optical disc recording and reproducing apparatus.
Figure 5:
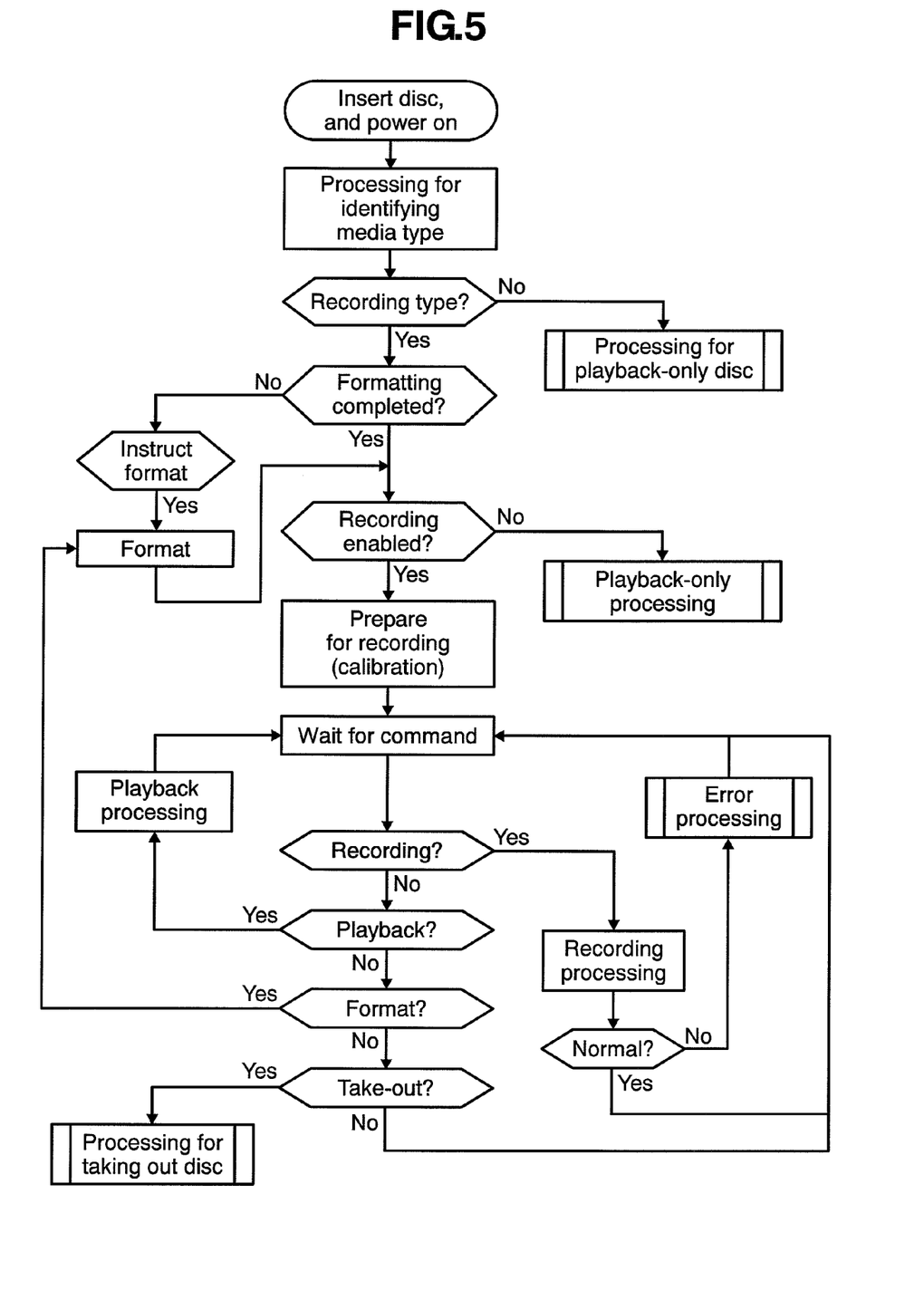
FIG. 5 is a flowchart of operations of the optical disc recording and reproducing apparatus.

FIG. 4 is a schematic view of a configuration of an optical disc recording and reproducing apparatus. The apparatus includes an optical head 2, a microprocessor 7, a memory 8, a signal reproduction block 41, a laser driver 51, and a servo circuit 61. Light (with a wavelength of about 650 nm for a DVD and of about 405 nm for a BD) is emitted from a laser source 25 that is a component of the optical head 2, and then passes through a collimator lens 24 to be collimated into a substantially linear light beam 22. The light beam 22 is irradiated on an optical disc 11 through an objective lens 23, thereby forming an optical spot 21. The light beam 22 is then led to a servo signal detector 26 and a main signal detector 27 via a beam splitter 28, a hologram element 29, or the like.

Signals from each detector are subjected to addition and subtraction to become servo signals such as tracking error signals or focus error signals, and are then inputted to the servo circuit 61. The servo circuit 61 controls positions of a driving unit 31 of the objective lens 23 and the entire optical head 2 based on the obtained tracking error signals and focus error signals so as to position the optical spot 21 in a targeted area for recording and reproduction.

Addition signals from the main signal detector 27 are inputted into the signal reproduction block 41. The inputted signals are subjected to filtering, frequency-equalization, and then are digitalized in a signal process circuit, followed by decoding in an address detection circuit and a demodulation circuit. The microprocessor 7 computes the position of the optical spot 21 on the optical disc 11 based on address information detected by the address detection circuit while positioning the optical head 2 and the optical spot 21 in a targeted area for recording and reproduction by controlling an automatic position control unit.

When the optical disc recording and reproducing apparatus receives an instruction for recording from a higher-level device 9, the microprocessor 7 receives user data from the higher-level device 9, stores the data in the memory 8, and positions the optical spot 21 in a targeted recording area by controlling the automatic position control unit. After the microprocessor 7 confirms proper positioning of the optical spot 21 in a recording area by referring to address signals from the signal reproduction block 41, user data stored in the memory 8 is modulated and recorded in a targeted recording area by controlling the laser driver 51 or the like.

Next, operations of the optical disc recording and reproducing apparatus shown in FIG. 4 is described with reference to FIG. 5.

When the optical disc 11 is loaded into the apparatus or the power thereof is turned on, the apparatus first performs medium type determination processing to specify a type of the optical disc 11. The determination processing may have a different specification for each apparatus. For example, a type of the optical disc 11 may be specified from a reflectance of the optical disc or analog characteristics of reproduction signals such as focus error signals. A type of a medium may be specified by contents or data that is obtained by reproducing physical information of the medium from areas holding the physical information provided on the optical disc 11.

When it is determined that a type of a medium is the optical disc which is an object of the present embodiment, the optical disc recording and reproducing apparatus examines disc management information recorded in a disc management area (DMA) or the like, and determines whether the optical disc has been physically formatted or not. When it is determined that the optical disc has not been physically formatted, the apparatus waits for an instruction for physically formatting from the higher-level device 9.

When it is determined that the optical disc 11 has been physically formatted, the apparatus performs recording preparation processing, such as calibration or logical integrity verification, and then waits for an instruction from the higher-level device 9. When any instruction is received, the apparatus determines a type of the instruction. When the instruction is for recording, the apparatus performs user data recording processing. When the instruction for reproduction, formatting, or unloading of a disc is received, the apparatus performs processing corresponding to each instruction. The processing is generally terminated properly. In the case of unsuccessful recording due to unexpected reasons, an error recovery processing is performed by use of replacement processing using spare areas.

When a DVD-RAM is used as an optical disc, the recording processing is performed, actual reproduction of user data is performed from the optical disc 11, and as required, replacement processing is performed using another recording unit area in order to verify that the user data has been properly recorded. Such processing results in improvement of reliability of data recorded on a medium. Reassignment information of recording areas by replacement processing is recorded subsequently in a disc management area DMA on a recording medium as a defect management table having a plurality of defect lists. In streaming recording requiring real time processing such as video recording, recoded data verification processing may be omitted since there is no time for reproduction for verification immediately after recording, retry, or replacement processing.

Figure 2:
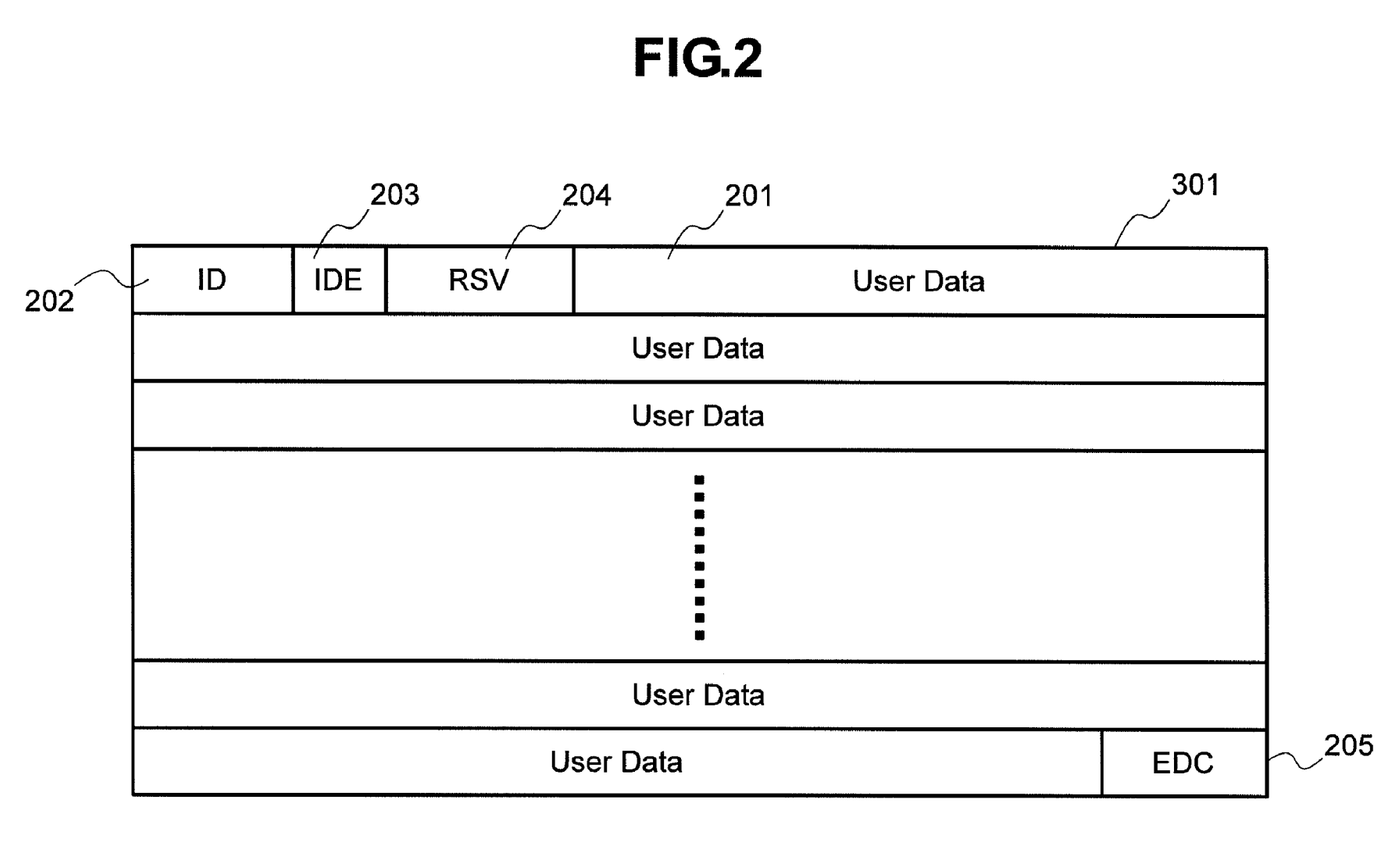
FIG. 2 schematically illustrates a configuration of a data frame.
Figure 3:
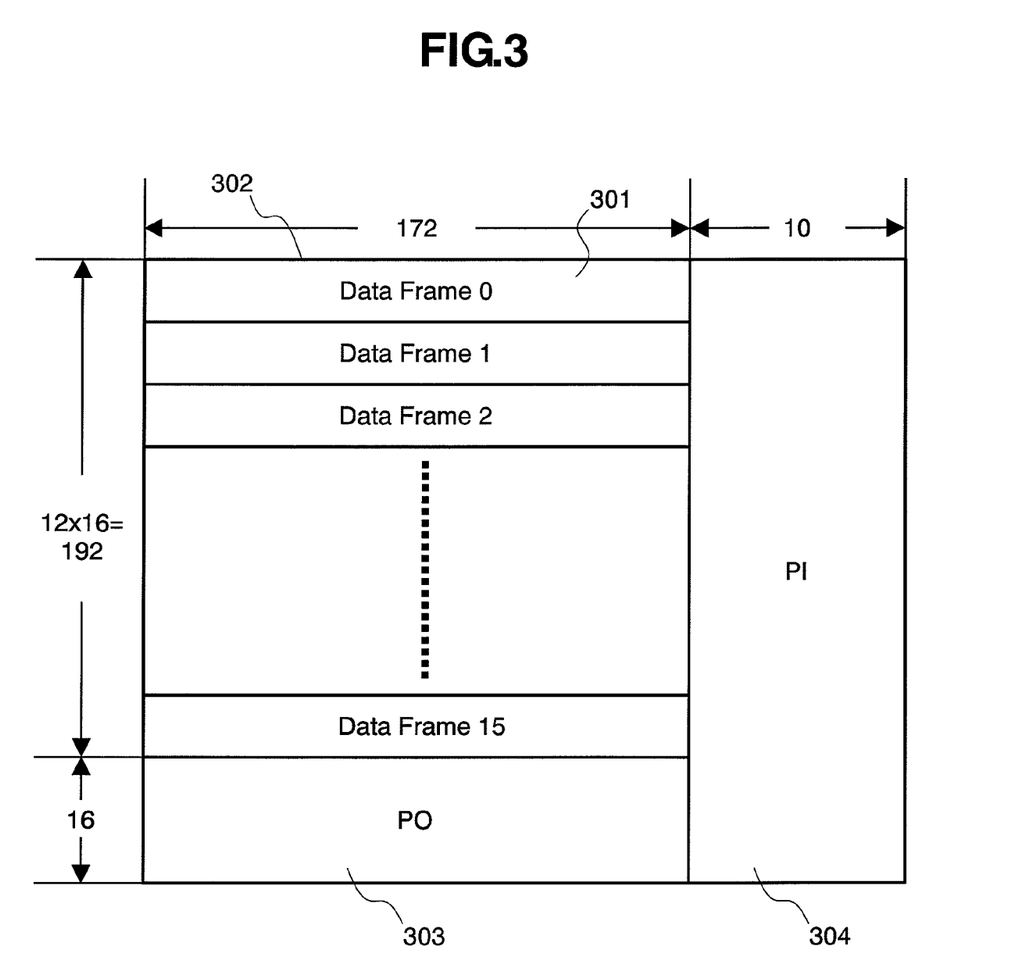
FIG. 3 schematically illustrates a configuration of an ECC block.

With reference to FIGS. 2 and 3, an encoding process for encoding user data to recorded data upon recording is described in detail below.

FIG. 2 shows an example of a configuration of a data frame 301. The data frame 301 is a data sequence having a set of user data 201 and information data for managing the user data 201. The user data 201, which is inputted from the higher-level device 9 and has 2048 bytes, is provided with a data identifier (ID) 202 that identifies data and have 4 bytes, an ID error detection code (IED) 203 having 2 bytes, and a reserved data area (RSV) 204 having 6 bytes. On the end of the data sequence is provided an error detection code (EDC) 205 that detects errors in data and has 4 bytes. As described above, the data frame 301 is configured to have 2064 bytes. Each data frame 301 is formed into 12 columns of 172 bytes.

FIG. 3 shows an example of a configuration of an ECC block 302. The ECC block 302 forms a data unit for recording and reproduction in the apparatus. The data frame 301 in 12 columns of 172 bytes as shown in FIG. 2 is subjected to scrambling to form the ECC block 302 in a unit of 16 data frames. Each vertical column is provided with parity of outer code (PO) 303 having 16 bytes, thereby providing 208 columns. Parity of inner code (PI) 304 having 10 bytes is provided on the data in each expanded column to provide data having 182 bytes. The ECC block 302 includes 208 columns of 182 bytes and the user data 201 having 2048 bytes multiplied by 16.

The microprocessor 7 shown in FIG. 4 produces the ECC block 302, which is then modulated to restrict frequency components included in data like in the last encoding process, and records the data on the optical disc 11 through the laser driver 51.

Upon recording the user data 201, the optical disc recording and reproducing apparatus, which performs defect management by replacement, reproduces data recorded on the optical disc 11 immediately after recording of the data. The apparatus then compares the reproduced data with user data stored in the memory 8, or performs an error correction process to detect the number of errors included in the reproduced data, thereby verifying that the data has been properly recorded on the optical disc 11. When it is determined that the data has not been properly recorded, the apparatus regards such data position as a defect area, and performs replacement to record the user data 201 stored in the memory 8 in a spare area.

Figure 6:
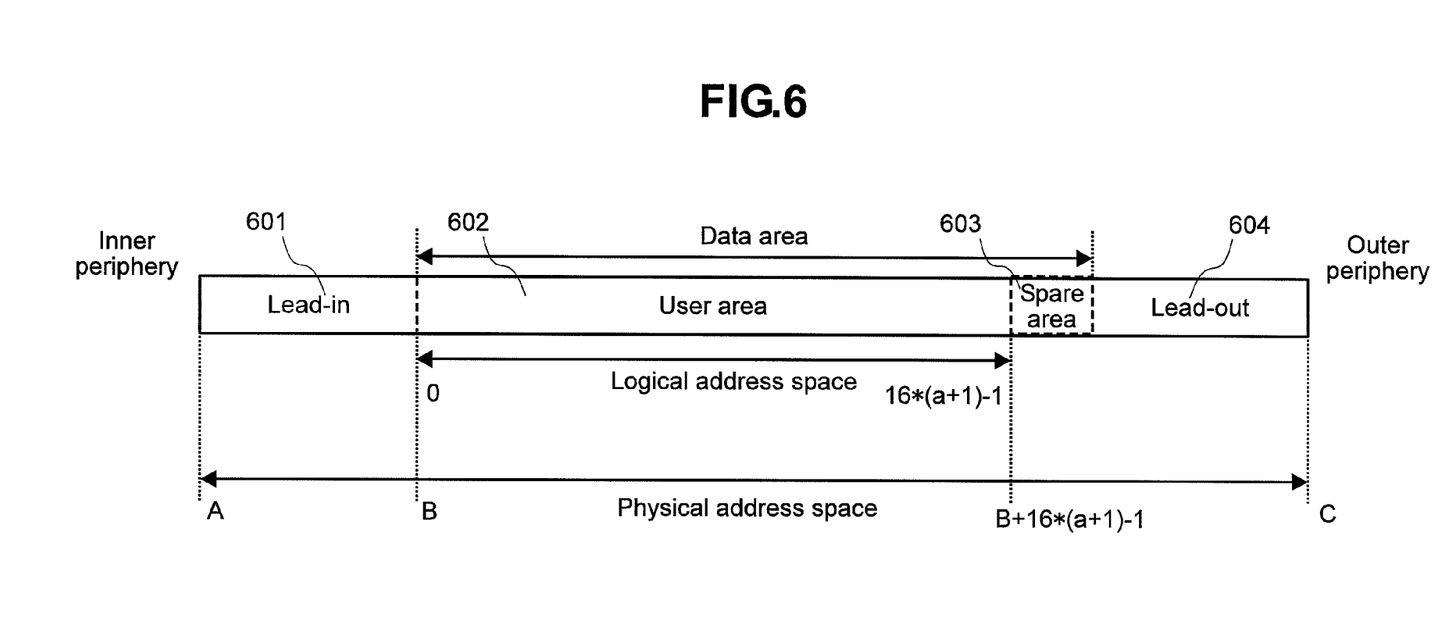
FIG. 6 illustrates a correlation between a logical address space and a physical address of an optical disc.

FIG. 6 shows a relation between a physical address of the optical disc 11 that is divided in areas according to purposes and a logical address included in a recording and reproduction instruction received from the higher-level device 9. The optical disc 11 according to the present embodiment is logically divided into a lead-in 601, a data area including areas 602 and 603, and a lead-out 604. The present embodiment gives an example in which the data area is logically divided into the user area 602 and the spare area 603 for defect management.

Starting physical addresses of the lead-in 601 and the data area 602 are A and B respectively, and an ending physical address of the lead-out 604 ends at C. Although the optical disc 11 may have a definition of A>B>C based on its type, the optical disc 11 have a definition of A<B<C in the following description. With such configuration, a logical address is assigned only to the user area 602 at an initial setting. When replacement is not performed, a logical address n corresponds to a physical address B+n. When the physical address B+n is reassigned another address because replacement is to be performed, the logical address n corresponds to the reassigned physical address. Therefore, when a final address of the user area 602 is B+16*(a+1)−1, a logical address space to be used ranges from 0 to 16*(a+1)−1. Herein, a denotes the number of the ECC blocks.

Figure 7:
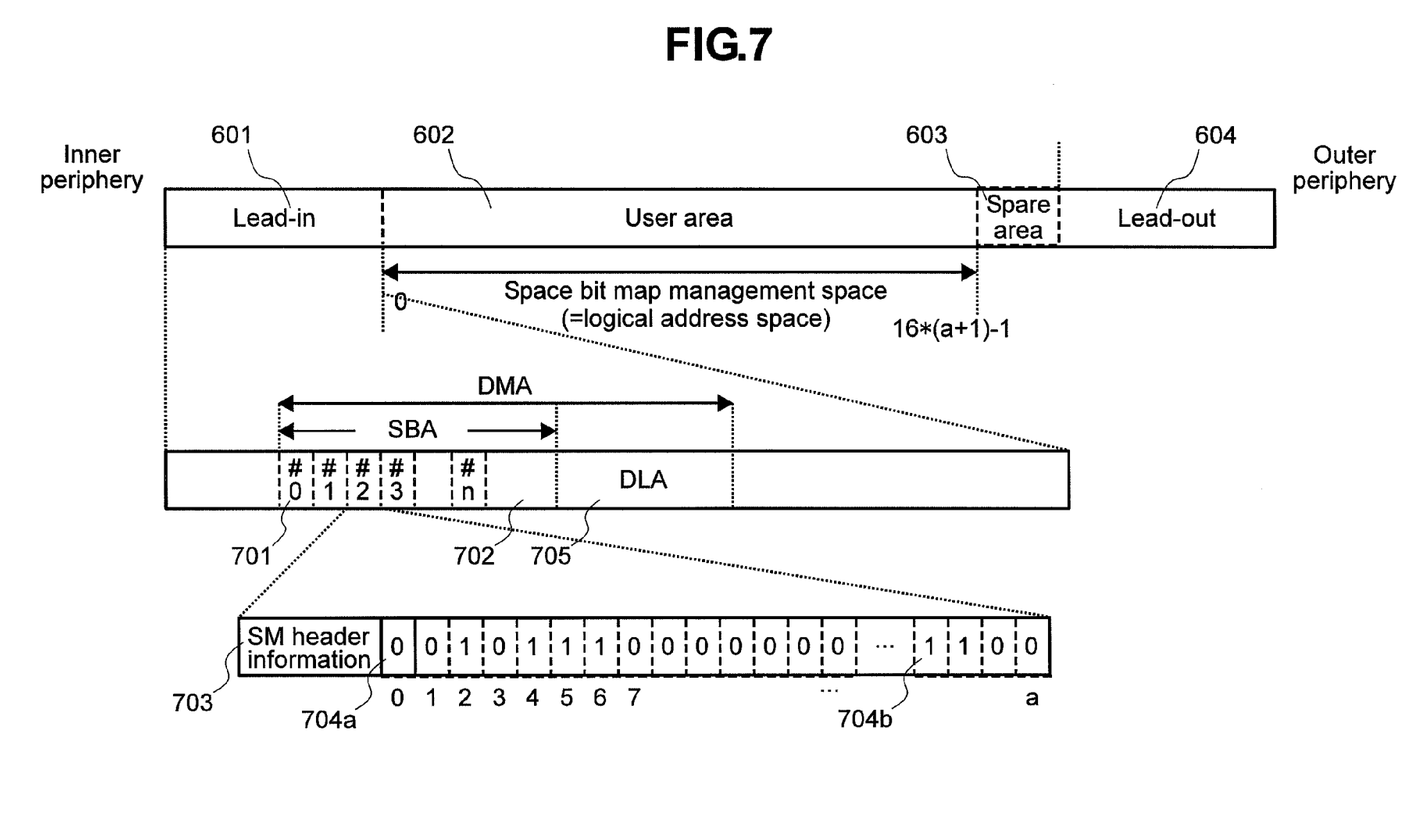
FIG. 7 schematically illustrates a configuration of management information of a recordable optical disc in which random writing is possible.

Next, description is made of a method for managing and updating disc management information of the optical disc 11 with reference to FIG. 7.

As shown in FIG. 6, the optical disc 11 is logically divided into areas according to respective purposes. A disk management area (DMA), which includes areas 702 and 705, in the lead-in 601 has a space bit map recording area (SBA) 702 and a defect management table recording area (DLA) 705. In the space bit map recording area 702 is recorded a space bit map (SBM) 701 showing that each address of the user area 602 is recorded or not recorded. In the defect management table recording area (DLA) 705 are recorded a defect address of the user area, a replacement address of the spare area 603 used as a replacement place, and a defect management table (DLT) including a plurality of defect management lists (DL) showing a relation of the defect address and replacement address.

Each area of SBA 702 and DLA 705 are continually used in a direction from the lead-in 601 toward the lead-out 604 of the optical disc 11. That is, when user data is recorded in the user area 602 on the optical disc 11, the latest SBM 701 and DLT, which is stored temporarily in the memory 8 of the apparatus and is consistent with a current status of the disc, are updated when the disc management information is updated upon unloading the disc or the like. In the present embodiment, disc management information temporarily stored in the memory 8 is written in the SBA 702 and DLA 705 of the optical disc 11 for updating. In such optical disc that updates the disc management information according to predetermined arrangements, it is possible to allow compatibility among a plurality of types of optical disc recording and reproducing apparatuses by reading out the disc management information recorded on the lead-out side end of each recording area on SAB 702 and DLA 705 of the DMA upon loading of an optical disc into the apparatus, or the power on thereof.

Each SBM 701 recorded on the SBA 702 is management information for checking that any data is recorded or not in each physical block for recording one ECC block 302, which is a minimum physical recording unit of recordable optical discs incapable of physically writing. The SBM 701 includes SM header information 703 and a plurality of bit information. The SM header information 703 includes information showing a relation between a physical address information of the user area 602 and SBM. The plurality of bit information corresponds to each physical address of the user area 602.

The plurality of bit information blocks align in the order of physical addresses of the user area 602, that is, from starting physical address to ending physical address. The present invention, however, does not any limitation on the order, and the order may be a reversed order as long as the plurality of bit information blocks align in a certain order corresponding to the physical addresses.

The use of the bit information makes it possible to record transferred user data on the optical disc 11 without the need to previously perform the recording integrity verification processing of recording areas of the optical disc 11 corresponding to a logical address, on which recording is required from the higher-level device 9. A physical recording unit of the optical disc 11 is the ECC block 302, and therefore a piece of the bit information 704 corresponds to a ECC block 302, which includes 16 continuous physical addresses in the present embodiment. When a logical address ranges from 0 to 16*(a+1)−1, the bit information 704 of the number (a+1) is required. In the embodiment, when the bit information 704a shows "0", no data is recorded in the corresponding physical address area, and when the bit information 704b shows "1", data is recorded in the corresponding physical address.

Figure 8:
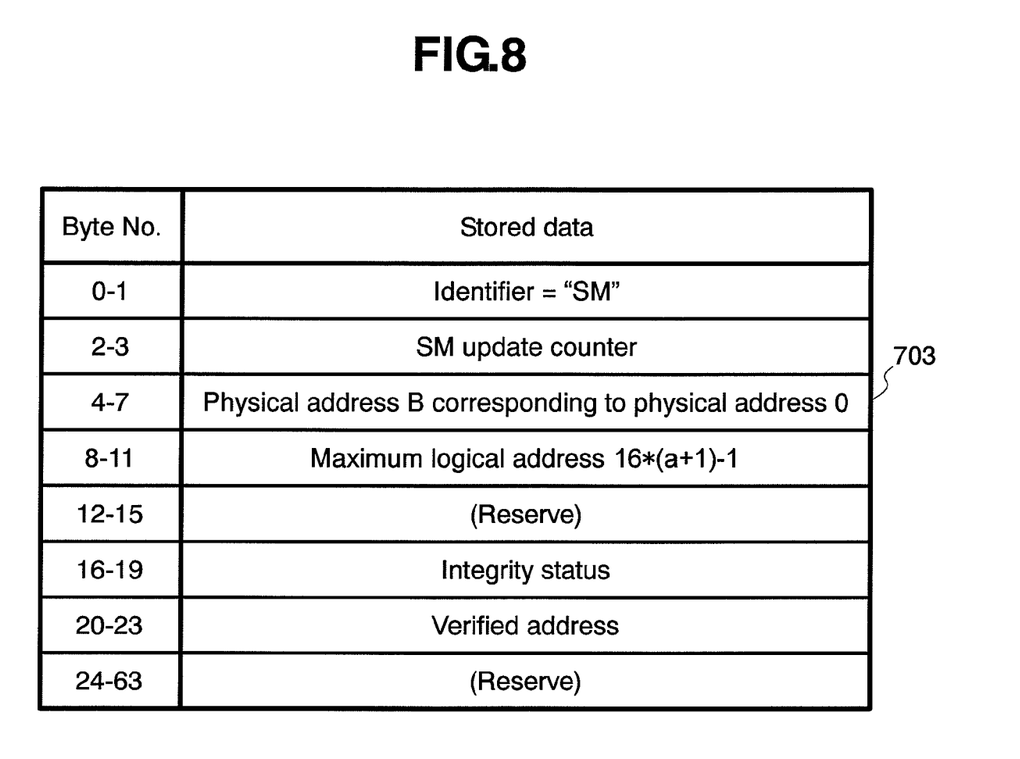
FIG. 8 schematically illustrates a configuration of SM header information.

FIG. 8 shows a data structure of the SM header information 703. The bytes of 0 to 1 are provided with an identifier "SM" for identifying the SBM 701. The bytes of 2 to 3 are provided with a SM update counter that is set to zero for SBM initially produced upon disc formatting, and afterward the counter is increased one by one every time the SBM 701 is updated. The bytes of 4 to 7 are provided with a physical address, which is B in FIG. 6, corresponding to a logical address 0, and the bytes of 8 to 11 are provided with a maximum logic address, which is 16*(a+1)−1 in FIG. 6.

The bytes of 16 to 19 are provided with a integrity status for indicating a progress of the integrity verification processing for SBM integrity restoration. The bytes of 20 to 23 are provided with a verified address for indicating an address having completed the integrity verification processing.

The integrity verification processing as used herein is defined as recorded/unrecorded verification processing for verifying the integrity of the bit information and a recording status (recorded/unrecorded) of recording areas of the ECC block on an actual writable optical disc. The bit information shows that each recording area of the ECC block, which is the minimum physical recording unit of recordable optical discs, has been recorded or not recorded. The integrity verification processing will be described in detail later.

The integrity verification processing for the SBM integrity restoration uses the integrity status that shows three statuses including integrity verification required showing that there is no integrity in the SBM, integrity verification in execution showing that the integrity verification processing for the SBM integrity restoration is being executed, and no integrity verification required showing the integrity is ensured in the SBM. The integrity verification processing uses the address verified that indicates a physical address, to which the integrity verification processing has been completed, when the integrity status shows that the execution of the integrity restoration processing is in progress. That is, a physical address recorded in the address verified shows that the integrity has been ensured in physical addresses preceding the address verified even when the integrity verification processing is being executed.

The integrity verification indicating whether or not integrity verification is required is used to show whether the SBM has been properly updated. Namely, the integrity status is set to the integrity verification not-required when the SBM has been properly updated and is set to the integrity verification required when the SBM has not been properly updated.

When data is first recorded in the user area 602 after loading of an optical disc into the apparatus, or the power on thereof, the SBM 701, which have set the integrity status showing the SBM integrity status to the integrity verification required, is recorded in the SBA 702 of the optical disc 11. When the final SBM 701 of the SBA has the integrity status of the integrity verification required, the SBM 701, which has the integrity status of the integrity verification not-required and is consistent with the memory 8, is recorded in the SBA 702 when the optical disc is unloaded from the apparatus or before the power of the apparatus is turned off. That is, when the final SBM 701 of the SBA 702 is read out upon loading of the optical disc into the apparatus or the power on thereof, the integrity status is expected to be the integrity verification not-required. When the SBM 701 having the integrity, however, is not recorded on the optical disc 11 due to a failure in proper termination of the higher-level device, the integrity status is not updated, and therefore the SBM 701 read out is still set to the integrity verification required showing lack of the integrity.

Figure 9:
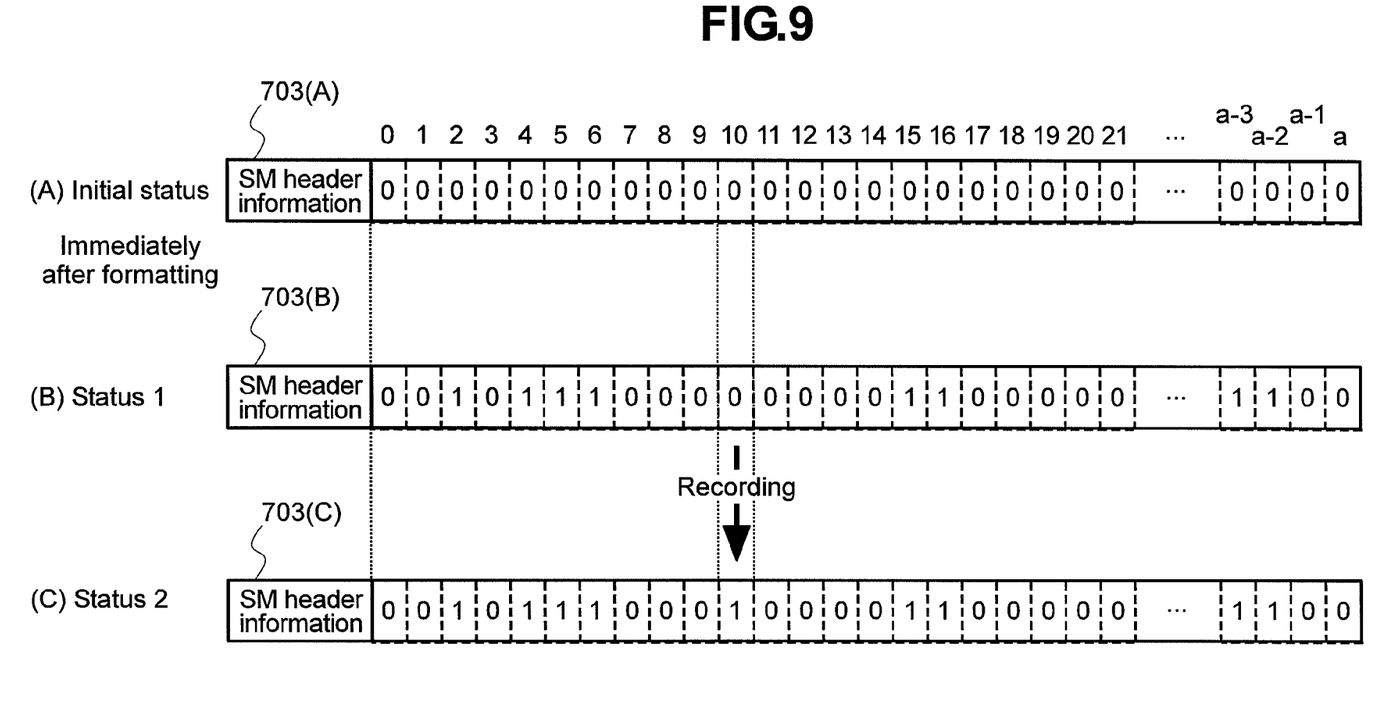
FIG. 9 is a schematic view for illustrating changes of SBM.

FIG. 9 shows state changes of the bit information 704.

FIG. 9A shows an initial state of a sequence of the bit information 704 right after formatting. Since no data has been recorded in the entire user area 602 on the optical disc 11 right after formatting, all of the bit information of the SBM 701 is set to "0". Under such condition, the SM update counter included in the SM header information 703(A) is set to its initial value, which is "0". FIG. 9B shows a sequence of the bit information 704 on status 1 in process of recording on the optical disc. FIG. 9C shows a sequence of the bit information in status 2, which is changed form the status 1 of FIG. 9B, where the ECC block 302 corresponding to the logical addresses 160 to 175, which corresponds to the bit information No. 10, is recorded on the optical disc 11. Although the status 1 in FIG. 9B shows that the bit information No. 10 has a value of "0" indicating that no recording has been made, the value is changed to "1" indicating that recording has been made in the status 2 in FIG. 9C.

Figure 10:
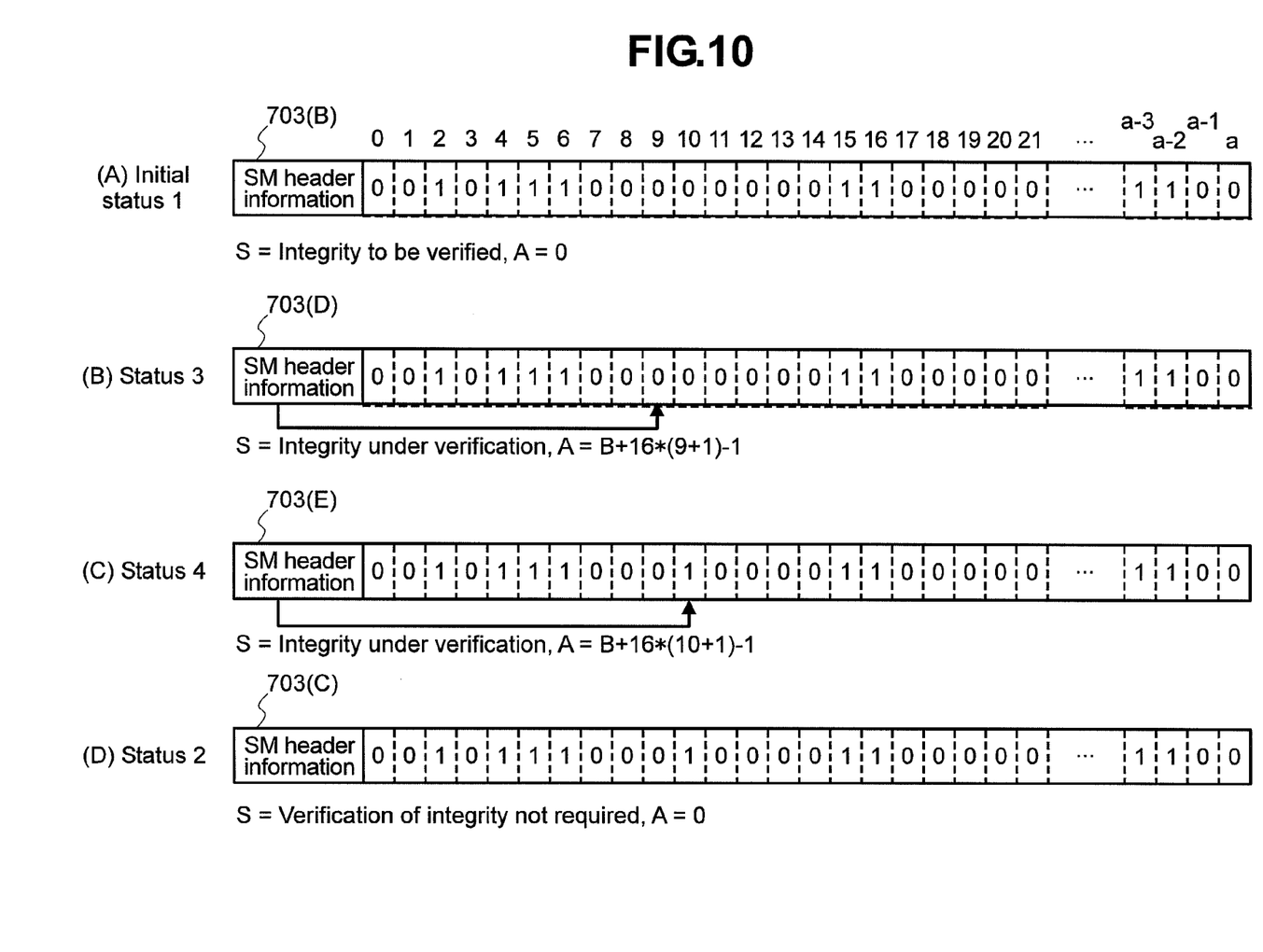
FIG. 10 is a schematic view for illustrating changes of SBM during a restoration process.

FIG. 10 shows a process in which the apparatus restores the SBM 701 having the integrity status of the integrity verification required as shown in status 1 of FIG. 9B, thereby producing the consistent SBM 701. The optical disc recording and reproducing apparatus reads out the latest SBM 701 from the DMA of the optical disc 11, which is then stored in the memory 8 temporarily. When the integrity status of the SM header information block 703 indicates the integrity verification required as shown in status 1 of FIG. 10A, the integrity status in the SM header information block 703 of the SBM 701 stored in the memory 8 is set to the integrity verification in execution. Next, actual data is read out from the physical address B corresponding to the logical address 0 stored in the SM header information block 703 of the optical disc 11 and the integrity verification processing is carried out, thereby determining whether data is recorded in each recording area corresponding to each bit information block having the value of 0 indicating an unrecorded state.

Status 3 in FIG. 10B shows a status in the integrity verification processing for restoring the integrity of the SBM. When the integrity verification processing starts from the physical address B corresponding to the logical address 0 and ends at the physical address B+16*(9+1)−1 corresponding to the bit information block No. 9 in the user area 602, the verified address of the SM header information block 703 in the memory 8 is updated to be B+16*(9+1)−1.

When the optical disc 11 is unloaded from the apparatus or the power thereof is turned off in such status, the SBM 701 in status 3 having the integrity status of the integrity verification in execution and the verified address of B+16*(9+1)−1 is recorded in the SBA 702 of the optical disc 11, followed by unloading of the optical disc and the power off of the apparatus.

When the final or latest SBM 701 of the SBA 702 is read out upon reloading of the optical disc into the apparatus or the power on thereof again, the integrity status indicates the integrity verification in execution. However, the verified address of B+16*(9+1)−1 is recorded, which makes it possible to determine that the addresses up to the verified address have the integrity. Therefore, the integrity verification processing can start from the next physical address B+16*(9+1) in order to continue the process.

Furthermore, the integrity ensured up to the verified address makes it possible to record data promptly in areas showing an unrecorded state within the addresses up to the verified address upon receiving an instruction for recording the user data from the higher-level device 9 even when the integrity status shows the integrity verification in execution.

Status 4 in FIG. 10C shows that the integrity verification processing has been completed up to the physical address B+16*(10+1)−1 corresponding to the bit information block No. 10 of the user area 602, in which the verified address of the SM header information block 703 is updated to be B+16*(10+1)−1. Although the bit information block No. 10 shows "0" indicating an unrecorded state in the SBM 701 read from the optical disc 11, the bit information block No. 10 is changed to "1" indicating a recorded state in the integrity verification processing because the result of the process determines the recording areas of the physical addresses B+16*10 to B+16*(10+1)−1 corresponding to the bit information block No. 10 has been recorded.

Status 5 in FIG. 10D shows that the integrity verification processing ends in the final physical address B+(a+1)−1 of the user data, which ensures the integrity of the SBM 701. Because the integrity is ensured, the integrity status of the SM header information block 703 is set to the integrity verification not-required again.

Although the present embodiment is described by using the three types of the integrity status and the verified addresses, other information may be used to show whether the integrity is ascertained or not, or the integrity status may simply show whether the integrity verification processing is being executed or not. Instead of recording the last verified recording area address in the verified address, an address from which the verification is started may be recorded in the verified address, which can produce the same effects.

Figure 11:
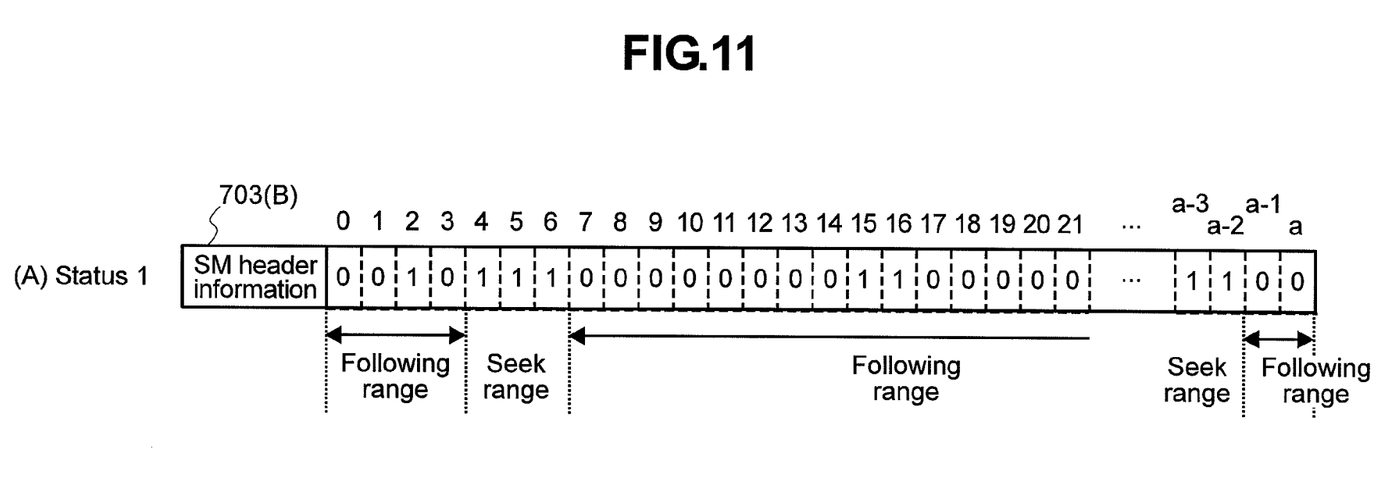
FIG. 11 is a schematic view for illustrating operations of an optical disc recording and reproducing apparatus during a restoration process.

FIG. 11 illustrates operations of the optical disc recording and reproducing apparatus in the integrity verification processing. As described above, each of the bit information blocks of the SBM is set to a value showing an unrecorded state as an initial value, and is changed to a value showing a recorded state after recording. The inconsistent SBM 701 means that, although data has been recorded in a recording area, the bit information block corresponding to the recording area has a value showing an unrecorded state. Therefore, the integrity verification processing need not be performed for a recording area corresponding to the bit information block indicating a recorded state in the inconsistent SBM 701. The apparatus skips subsequent consecutive recording areas whose number exceeds a pre-specified number and which show a recorded state in the SBM 701, by a seeking process, thereby determining whether data has been recorded in the recording area or not.

The pre-specified number shows the number of recording areas, which makes it possible to take less time to access a recording area with the bit information block indicating an unrecorded state, the bit information block being the next target for the integrity verification processing in the seeking process, compared with access passing through a recording area showing a recorded state in a following process. FIG. 11 shows an example of the integrity verification processing, in which the seeking process is performed when there are the three consecutive recording areas, each of which includes 16 physical addresses corresponding to the bit information blocks, and the following process is performed when there is one or two of recorded areas having a recorded state corresponding to the bit information blocks. By the above process, it is possible to shorten the time of the integrity verification processing.

The use of the above-mentioned SBM 701 makes it possible to receive other instructions from the higher-level device 9 during the integrity verification processing. That is, the apparatus can perform the integrity verification processing in its spare time by background processing.

Figure 1:
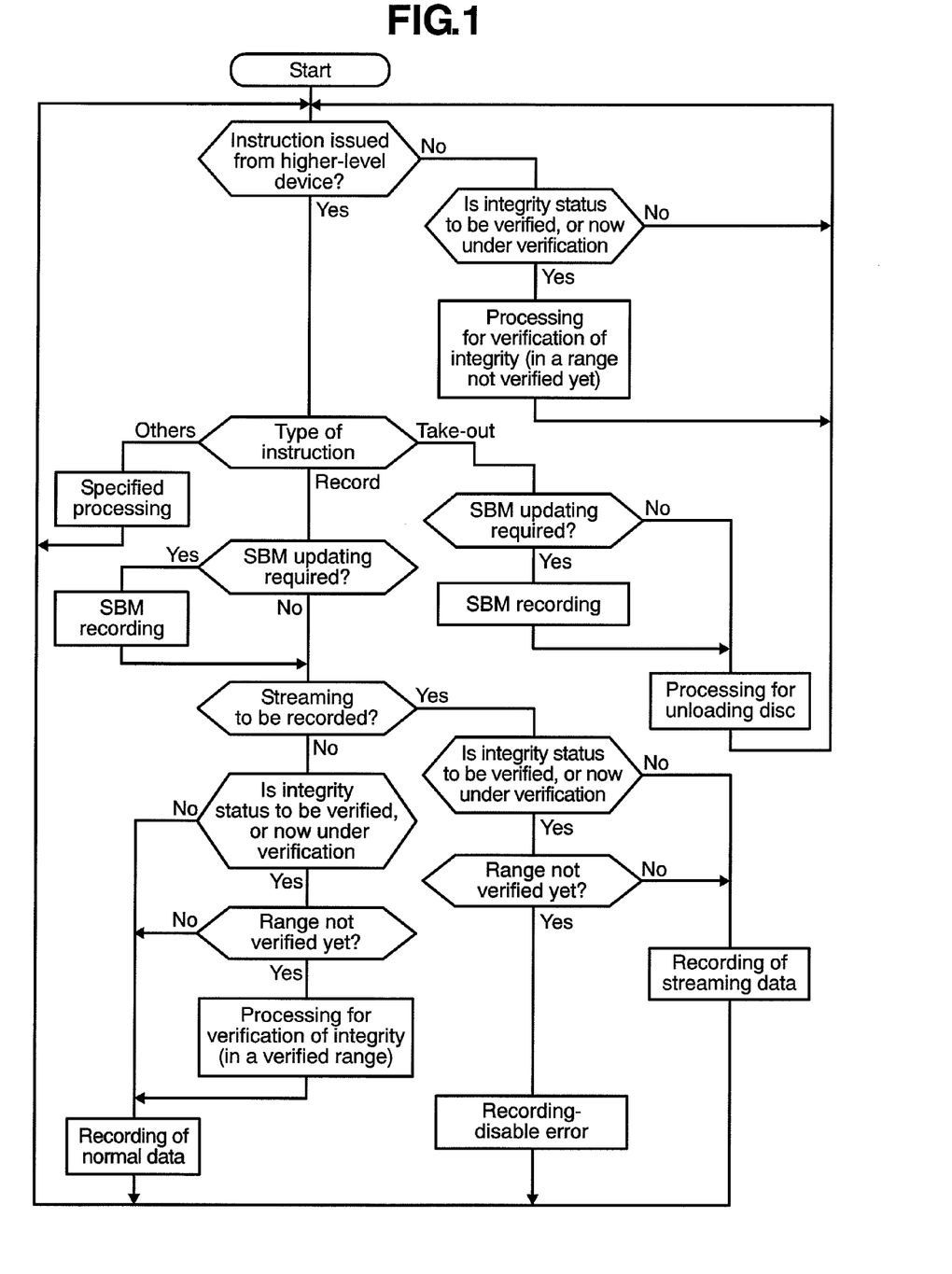
FIG. 1 is a flowchart of a restoration process of recorded/unrecorded data management information according to the present invention.

FIG. 1 shows a flowchart of operations of the apparatus in which the integrity verification processing for restoring the integrity of the SBM 701 is performed concurrently with operations in response to other instructions from the higher-level device 9, or by background processing. The apparatus confirms the integrity status included in the SM header information block 703 of the SBM 701 when no instruction is received from the higher-level device 9. When the integrity status shows the integrity verification required or the integrity verification in execution, the integrity verification processing is performed as described with reference to FIG. 10. The apparatus confirms the presence or absence of instructions from the higher-level device 9 during the integrity verification processing. When no instruction is received from the higher-level device 9, the integrity verification processing continues until the integrity of the SBM 701 is ensured.

When an instruction is received from the higher-level device 9, an address at which the verification ends is recorded in the verified address and the integrity verification processing is canceled temporarily, thereby preferentially performing operations according to the types of instructions. When the final SBM 701 of the SBA 702 on the optical disc 11 has the integrity status of the integrity verification required and the SBM 701 in the memory 8 of the apparatus has a different integrity status upon receiving an instruction for unloading the optical disc 11, updating of the SBM is determined to be necessary so that the recording of the SBM is updated.

When the final SBM 701 of the SBA 702 on the optical disc 11 has the integrity status of the integrity verification not-required or the integrity verification in execution upon receiving an instruction for recording in the user area 602, the SBM 701 on the optical disc 11 need to be updated so as to change the integrity status of the SBM 701 to the integrity verification required. When the integrity status is the integrity verification required or the integrity verification in execution, a recording operation is performed according to the type of a recording instruction.

In usual recording, confirmation is carried out to check whether the address required to be recorded by the higher-level device 9 has already been verified or not. When a result of the confirmation shows that the address has been verified, the corresponding flag information is determined as reliable. When the flag information shows an unrecorded state, the user data is recorded on the optical disc 11. When the flag information shows a recorded state, an error is reported to the higher-level device 9.

When the address required to be recorded by the higher-level device 9 has not been verified, the integrity verification processing for the address is performed, followed by updating the corresponding flag information as required. When the updated flag information shows an unrecorded state, the user data is recorded on the optical disc, and when the flag information shows a recorded state, an error is reported to the higher-level device 9 to indicate that it is impossible to record the user data.

When the recorded address follows the verified address, the verified address is updated up to the recording-required address that has been subjected to the integrity verification processing. Because the streaming recording, which is required to be performed in real time for a recording process, has no time for the integrity verification processing upon recording, recording is not performed in response to an instruction for recording in areas other than the verified area and an error is reported to the higher-level device 9.

Figure 12:
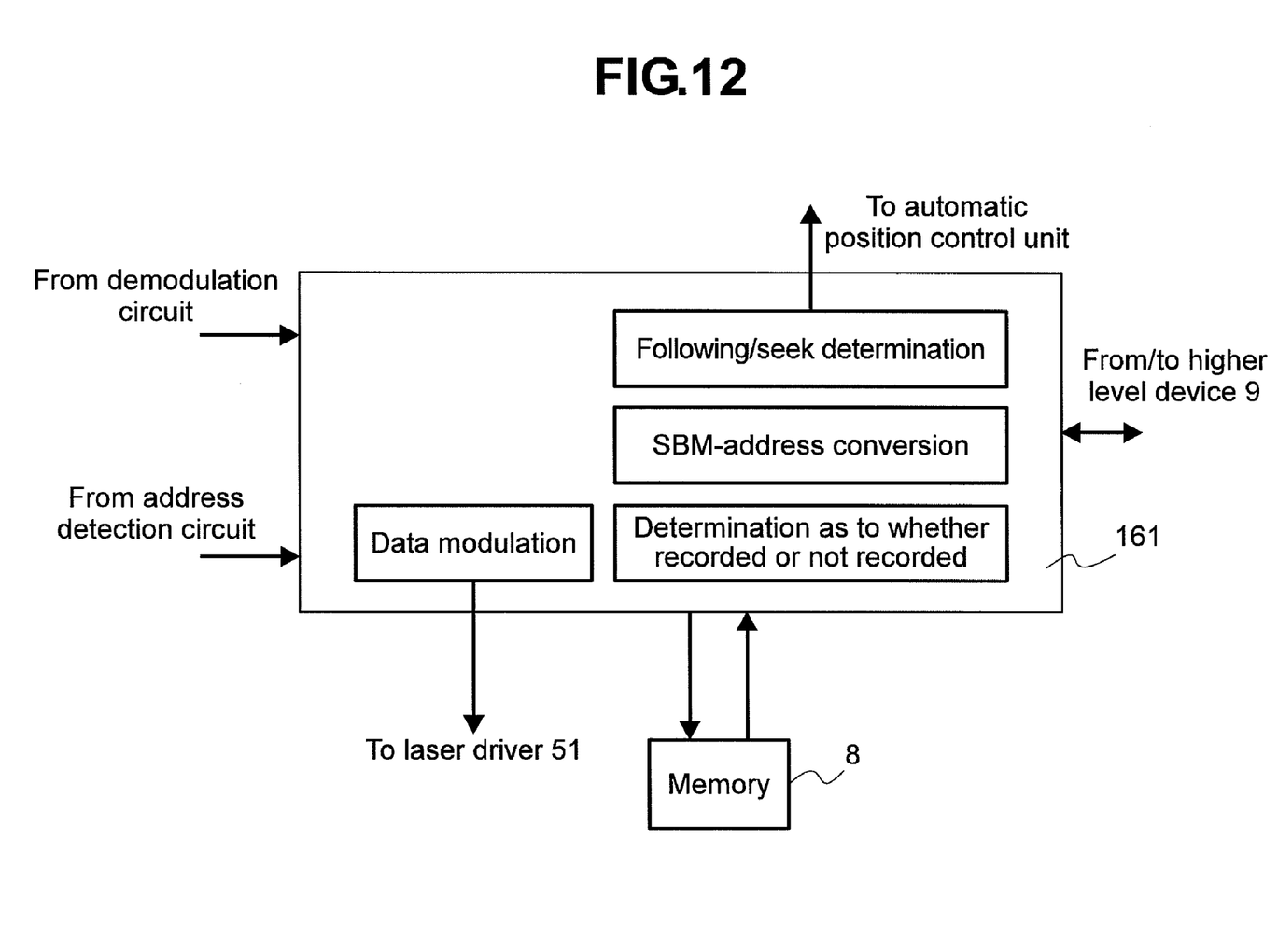
FIG. 12 schematically illustrates a configuration of a microprocessor of an optical disc recording and reproducing apparatus.

A digital data recording apparatus for achieving the present invention has a configuration similar to that of the optical disc recording and reproducing apparatus as shown in FIG. 4. The processes shown in FIGS. 1, 9, 10, and 11 are carried out by the microprocessor (operation processor) 7 shown in FIG. 12, and the processes include a conversion process of the physical address and the logical address from the SBM required for the restoration process of the consistent SBM, the following and seeking determination process, and the integrity verification processing in which a predetermined address is accessed to determine whether the recording area has been recorded or not and the determination result is reflected to the flag information of the SBM 701 stored in the memory 8.

The present embodiment shows an example of the optical disc recording and reproducing apparatus in which the microprocessor 7 processes the user data 201 stored in the memory 8 into the data frame 301 and the ECC block 302, and performs a modulation process thereof. The present invention, however, is not limited to such configuration. The apparatus may have a configuration in which a signal modulation circuit for performing these processes of the data frame 301, the ECC block 302 and the modulation is provided separately between the microprocessor 7 and the laser driver 51 in FIG. 4.

Furthermore, the apparatus may have a configuration in which the microprocessor 7 executes the integrity verification processing, or a circuit dedicated for the integrity verification processing is provided separately to carry out the integrity verification processing.

In the optical disc recording and reproducing apparatus according to the present invention as described above, the restoration process is performed in background processing to restore the inconsistent management information such as the SBM that manages a recorded or unrecorded state of each recording area of the random writable and recordable optical disc in order to produce the consistent management information, thereby making it possible to receive various instructions from the higher-level device 9 and shorten the time of the recovery process by use of the background processing. A status of the restoration process is recorded in the management information accordingly, thereby making it possible to unload the optical disc or turn off the power of the apparatus during the restoration process of the management information, and to continue the process upon reloading of the optical disc or turning the power on of the apparatus again. For the above-mentioned reason, it is expected that the present invention is generally used for random writable and recordable optical discs.

Even when the latest management information having the integrity can not be recorded on the recordable optical disc, the present invention enables to restore the consistent management information by use of the past management information recorded in the recordable optical disc at high speed. When the latest management information having the integrity is not recorded in the recordable optical disc, it is possible to carry out the recording and reproduction of the optical disc without waiting during the restoration process of the management information.

According to the present invention, even in the case where the latest management information having the integrity has not been recorded on the recordable optical disc, it is possible to restore the consistent management information from the past management information recorded on the disc, and to shorten the time to wait for the recording and reproduction process.

The embodiment of the recording method and the recording and reproducing apparatus according to the present invention was described above. The present invention, however, is not limited to the embodiment, and various improvements and modifications may be made without departing from the spirit of the present invention.

For example, the embodiment described above employs the integrity status and the verified address, which are recorded on the optical disc. However, either one of the integrity status and the verified address may be recorded on the optical disc. When the verified address is used without using the integrity status, the verified address may be recorded in the management area upon completion or suspension of the integrity verification processing. When the verified address has not been recorded in the management information area and it is determined that that the integrity verification processing has not been completed, the integrity verification processing may be carried out in turn from the first user data area by background processing. In such case, upon receiving an instruction for recording data in the user data area from the higher-level device, the integrity verification processing is performed on all or part of the user data area, thereby recording data in the unrecorded user data area having the integrity.

In the example described above, the verified address is not recorded in the management information area to show that the integrity verification processing has not been completed. For the substitution of such configuration, the minimum value, for instance "0", or an address that does not exist in the physical block may be recorded as the verified address.

When the recorded verified address is not the final physical address in the physical block of the user area and it is determined that the integrity verification processing has been completed halfway, the integrity verification processing may be carried out on the unverified management information subsequent to the verified address in the background processing. When an instruction for recording data in the user data area is received from the higher-level device, data may be recorded in the consistent user data area included within the verified address. When the verified address is the final physical address and it is determined that that the integrity verification processing has been completed on all of the physical blocks, the integrity verification processing may wait for an instruction from the higher-level device without being carried out in the background processing. When an instruction for recording data in the user data area is received from the higher-level device, the user data is promptly recorded in the physical block. After the recording of the user data, the integrity verification processing is performed.

The SBM may include the time when the integrity verification processing is carried out as well as the integrity status and the verified address information, and timing for performing the integrity verification processing and timing for recording the SBM may be managed based on the time.

With the recording method according to the present invention, when the integrity verification processing has not been completed and the processing has been performed halfway upon receiving an instruction for recording data, the data recording process need not start after the integrity verification processing is fully completed. The data recording process may be promptly performed in the data area that has been subjected to the integrity verification processing based on the verified address information read out. With the recording method according to the present invention, it is possible to shorten the time for starting the recording operation.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A method of recording user data on a recordable optical disc including a user area having a plurality of physical blocks and a management information area for storing a space bit map used to manage the user area, the method comprising:

recording the user data in each physical block in the user area;

recording the space bit map in the management information area; and successively executing integrity verification processing for checking whether recording status information indicating a recording state of each data is consistent with the recording state in physical blocks on the recordable optical disc for each recording status information, the recording status information being included in the space bit map and also being provided for each of the physical blocks, wherein:
the space bit map includes status information for determining whether the integrity verification processing is required;
when the status information is read out to determine whether the integrity verification processing is required and, when the integrity verification processing is required, the integrity verification processing is performed for recording state information not having been subjected to the integrity verification processing among the recording state information included in the space bit map, and the integrity verification processing is not performed for the recording state information already having been subjected to the integrity verification processing,
the status information includes verification completed information indicating that the integrity verification processing has been completed for all recording state information blocks, verification executing information indicating that the integrity verification processing for the space bit map integrity restoration is being executed, and verification-required information indicating that the integrity verification processing is required.

2. The method of recording user data in a recordable optical disc according to claim 1, further comprising:
recording the space bit map with the status information set to the verification required status in the management information area after the user data is recorded in a non-recorded physical block of the user area, and also recording the verification completed data as the status information in the management information area.

3. The method of recording user data in a recordable optical disc according to claim 2, further comprising:
reading out the space bit map and temporally storing the space bit map in a storage area; and
setting the status information in the space bit map stored in the storage area to the verification required status after the user data is recorded in the physical block.

4. The method of recording user data in a recordable optical disc according to claim 1, wherein:
the space bit map includes final recording status information when the integrity verification processing is last carried out or address information identifying a physical block which is a target for the integrity verification processing executed last; and
the integrity verification processing is performed for recording status information not having been subjected to the integrity verification processing by use of the final recording status information or the address information, after the integrity verification processing is suspended.

5. The method of recording user data in a recordable optical disc according to the claim 1, wherein:
the recording status information is bit information indicating whether any data is recorded in the physical block; and
the integrity verification processing is performed for each bit information indicating that no data is recorded in each physical block by referring to each of the physical blocks in which data is not recorded, the physical blocks being identified by the bit information, to check whether data is recorded in the user data.

6. The method of recording user data in a recordable optical disc according to claim 5, wherein the bit information is allocated in the management information area in the order of physical addresses of the physical blocks.

7. The method of recording user data in a recordable optical disc according to claim 1, further comprising:
after receiving an instruction for recording to an arbitrary position in the user area of the recordable optical disc, switching the recording processing according to whether the physical block specified based on the instruction for recording is a physical block corresponding to management information with integrity ensured.

8. The method of recording user data in a recordable optical disc according to claim 1, further comprising:
switching between a mode for receiving an instruction for recording and a mode for rejecting the instruction according to whether a physical block that is specified for recording data therein in the user area of the recordable optical disc and that is included in the instruction for recording from a higher-level device is a physical block corresponding to management information with integrity ensured.

9. A recording and reproducing apparatus for performing random recording on an optical recordable disc including a management information area for storing a space bit map and a user area having a plurality of physical blocks, a recording status of each physical block in the user area being managed by the space bit map, the recording and reproducing apparatus comprising:
a recording unit that records the user data in each physical block in the user area and also records the space bit map in the management information area of the recordable optical disc;
a reproducing unit that reproduces the space bit map from the recordable optical disc;
a verifying unit that performs integrity verification processing for verifying whether a recording status of each physical block in the space bit map read out by the reproducing unit is consistent with a recording status of each physical block on the recordable optical disc,
wherein, when the integrity verification processing performed by the verifying unit is suspended halfway, the recording unit records verification completed information for identifying a physical block or physical blocks corresponding to recording status information having last been verified in a specified area in the management information area of the recordable optical disc, and
wherein the verifying unit starts, after the integrity verification processing is suspended once and then restarted, the integrity verification processing from a physical block not having been subjected to the integrity verification processing before the suspension based on the verification completed information.

10. The recording and reproducing apparatus according to claim 9, wherein:
the space bit map includes recording status information provided for each physical block and indicating a recording status of each physical block; and
the verifying unit performs the integrity verification processing for each of recording statuses.

11. The recording and reproducing apparatus according to claim 9, wherein the verification completed information is recorded when a power is disconnected or the recordable optical disc is unloaded.

12. The recording and reproducing apparatus according to claim 9, wherein the verifying unit executes the integrity verification processing while the recording unit does not operate.

* * * * *